US009319432B2

(12) United States Patent
Kurashima

(10) Patent No.: US 9,319,432 B2
(45) Date of Patent: Apr. 19, 2016

(54) INFORMATION PROCESSOR, INFORMATION PROCESSING METHOD AND NON-TRANSITORY STORAGE MEDIUM STORING INFORMATION PROCESSING PROGRAM

(75) Inventor: Akihisa Kurashima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 48 days.

(21) Appl. No.: 13/990,736

(22) PCT Filed: Sep. 21, 2011

(86) PCT No.: PCT/JP2011/005314
§ 371 (c)(1),
(2), (4) Date: May 30, 2013

(87) PCT Pub. No.: WO2012/073416
PCT Pub. Date: Jun. 7, 2012

(65) Prior Publication Data
US 2013/0250943 A1 Sep. 26, 2013

(30) Foreign Application Priority Data
Nov. 30, 2010 (JP) ................. 2010-267875

(51) Int. Cl.
H04L 12/66 (2006.01)
H04L 29/06 (2006.01)
H04L 29/12 (2006.01)
H04M 7/00 (2006.01)
(Continued)

(52) U.S. Cl.
CPC ........ *H04L 65/1013* (2013.01); *H04L 61/1529* (2013.01); *H04L 61/25* (2013.01);
(Continued)

(58) Field of Classification Search
CPC ... H04L 61/25; H04L 61/2503; H04M 7/0075
USPC ........................................................ 370/352
See application file for complete search history.

(56) References Cited

U.S. PATENT DOCUMENTS

2003/0050755 A1* 3/2003 Sakata .................. G01S 5/0009
701/300
2003/0093563 A1* 5/2003 Young ................. H04L 12/4633
709/245
(Continued)

FOREIGN PATENT DOCUMENTS

JP 2005-072817 A 3/2005
JP 2006-333448 A 12/2006
(Continued)

OTHER PUBLICATIONS

The international search report for PCT/JP2011/005314 mailed on Nov. 1, 2011.

*Primary Examiner* — Asad Nawaz
*Assistant Examiner* — Syed S Ali

(57) ABSTRACT

Provided is an information processor that receives a request for initiating a call between a phone on the calling side and a phone on the called side and performs call transmission with respect to the phone on the calling side and the phone on the called side, the information processor including: a registration unit that registers a list of a plurality of IP address conversion servers performing IP address conversion needed for a call between the phone on the calling side and the phone on the called side; a selection unit that selects, on the basis of the location of the phone on the calling side or the phone on the called side, the IP address conversion server to be used from the list that is registered in the registration unit; and a call execution unit that executes, using the selected IP address conversion server, a call while performing IP address conversion for voice packets exchanged between the phone on the calling side and the phone on the called side.

8 Claims, 11 Drawing Sheets

(51) Int. Cl.
*H04W 4/16* (2009.01)
*H04M 3/42* (2006.01)
*H04W 4/02* (2009.01)

(52) U.S. Cl.
CPC ........ *H04L61/2503* (2013.01); *H04L 65/1036* (2013.01); *H04L 65/1053* (2013.01); *H04M 7/0075* (2013.01); *H04W 4/16* (2013.01); *H04L 61/2514* (2013.01); *H04L 61/2564* (2013.01); *H04M 3/42306* (2013.01); *H04M 7/006* (2013.01); *H04W 4/02* (2013.01)

(56) References Cited

U.S. PATENT DOCUMENTS

| | | | | |
|---|---|---|---|---|
| 2005/0223248 | A1* | 10/2005 | Lim | G06F 1/3287 713/300 |
| 2006/0193308 | A1* | 8/2006 | Sung | H04L 29/06027 370/352 |
| 2007/0097990 | A1* | 5/2007 | Ozaki | H04L 29/06027 370/395.52 |
| 2007/0232262 | A1* | 10/2007 | Uematsu | H04W 4/24 455/406 |
| 2008/0192917 | A1* | 8/2008 | Kurashima | H04Q 3/54566 379/221.14 |
| 2008/0263140 | A1* | 10/2008 | Yoshikawa | H04M 1/72561 709/203 |
| 2009/0245236 | A1* | 10/2009 | Scott et al. | 370/352 |
| 2009/0304013 | A1* | 12/2009 | Green | H04L 12/2859 370/401 |
| 2010/0318598 | A1* | 12/2010 | Yun et al. | 709/203 |
| 2014/0153563 | A1* | 6/2014 | Hlibiciuc et al. | 370/352 |

FOREIGN PATENT DOCUMENTS

| | | |
|---|---|---|
| JP | 2008-301228 A | 12/2008 |
| WO | 2006/080080 A1 | 8/2006 |

* cited by examiner

FIG. 4A

| BASE ID | SERVER IP ADDRESS |
|---------|-------------------|
| 0001 | 192.168.1.20 |
| 0002 | 192.168.20.23 |
| 0003 | 192.168.40.32 |
| 0004 | 192.168.61.22 |

| BASE ID | CORRESPONDING PHONE |
|---|---|
| 0001 | 192.168.0.0~23, 192.168.2.0~24 |
| 0002 | 192.168.20.0~22 |
| 0003 | 192.168.40.0~23 |
| 0004 | 192.168.60.0~23 |

402

INFORMATION PROCESSOR, INFORMATION PROCESSING METHOD AND NON-TRANSITORY STORAGE MEDIUM STORING INFORMATION PROCESSING PROGRAM

This application is a National Stage Entry of PCT/JP2011/005314 filed Sep. 21, 2011, which claims priority from Japanese Patent Application 2010-267875 filed Nov. 30, 2010, the contents of all of which are incorporated herein by reference, in their entirety.

TECHNICAL FIELD

The present invention relates to a technique that realizes a call between two terminals.

BACKGROUND ART

In the above technical field, as disclosed in Patent Document 1, a technique is known that converts an IP address for a call in a network phone system.

RELATED DOCUMENT

Patent Document

[Patent Document 1] Japanese Unexamined Patent Publication No. 2005-072817

DISCLOSURE OF THE INVENTION

However, in the technique of the related art, a device that performs the conversion of an IP address is prepared together with a call relay server in a data center. Therefore, all voice packets in a call between phones disposed at various locations are exchanged through the IP address conversion device. This causes a problem that traffic is concentrated on a network around the IP address conversion device.

An object of the invention is to provide a technique for solving the above-described problem.

In order to accomplish the above object, there is provided an information processor that receives a request for initiating a call between a phone on the calling side and a phone on the called side and performs call transmission with respect to the phone on the calling side and the phone on the called side, the information processor including: a registration unit that registers a list of a plurality of IP address conversion servers performing IP address conversion needed for a call between the phone on the calling side and the phone on the called side; a selection unit that selects, on the basis of the location of the phone on the calling side or the phone on the called side, the IP address conversion server to be used from the list that is registered in the registration unit; and a call execution unit that executes, using the selected IP address conversion server, a call while performing IP address conversion for voice packets exchanged between the phone on the calling side and the phone on the called side.

In order to accomplish the above object, there is also provided an information processing method that receives a request for initiating a call between a phone on the calling side and a phone on the called side to perform call transmission with respect to the phone on the calling side and the phone on the called side, the information processing method including: a selection step of registering a list of a plurality of IP address conversion servers performing IP address conversion needed for a call between the phone on the calling side and the phone on the called side, and selecting the IP address conversion server to be used from the list, on the basis of the location of the phone on the calling side or the phone on the called side; and a call execution step of executing, using the selected IP address conversion server, a call while performing IP address conversion for voice packets exchanged between the phone on the calling side and the phone on the called side.

In order to accomplish the above object, there is also provided an information processing program that receives a request for initiating a call between a phone on the calling side and a phone on the called side to perform call transmission with respect to the phone on the calling side and the phone on the called side, the information processing method including: a selection step of registering a list of a plurality of IP address conversion servers performing IP address conversion needed for a call between the phone on the calling side and the phone on the called side, and selecting the IP address conversion server to be used from the list, on the basis of the location of the phone on the calling side or the phone on the called side; and a call execution step of executing, using the selected IP address conversion server, a call while performing IP address conversion for voice packets exchanged between the phone on the calling side and the phone on the called side.

According to the invention, in voice communication capable of being realized by exchanging voice packets while performing IP address conversion, the concentration of traffic can be avoided.

BRIEF DESCRIPTION OF THE DRAWINGS

The above-described objects, other objects, features and advantages will be further apparent from the preferred embodiments described below, and the accompanying drawings as follows.

FIG. 4A is a diagram illustrating a server list table according to the second embodiment of the invention.

FIG. 4B is a diagram illustrating a phone base table according to the second embodiment of the invention.

DESCRIPTION OF EMBODIMENTS

Hereinafter, embodiments of the invention will be described in detail with reference to the accompanying drawings. However, components described in the following embodiments are merely illustrative of the invention, and the technical scope of the invention is not limited to only them.

(First Embodiment)

Hereinafter, an information processor 100 according to a first embodiment of the invention will be described with reference to FIG. 1. The information processor 100 is a device that receives a request for initiating a call between a phone on the calling side 110 and a phone on the called side 120 and that performs a call transmission with respect to the phone on the calling side 110 and the phone on the called side 120.

Figure 1:
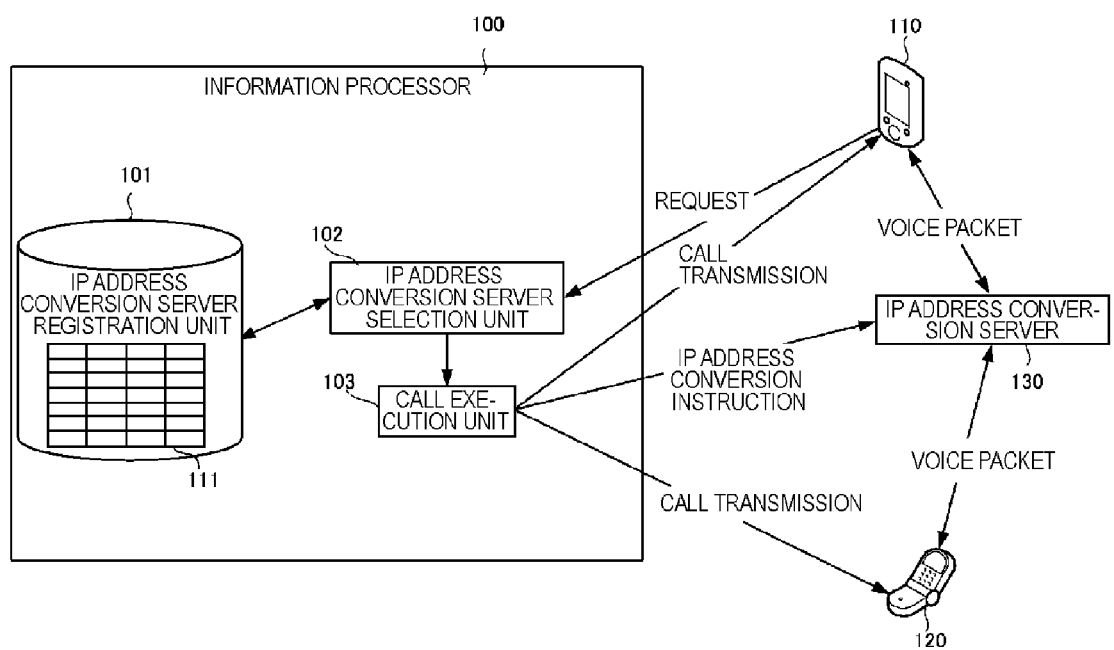
FIG. 1 is a block diagram illustrating a configuration of an information processing system according to a first embodiment of the invention.

As shown in FIG. 1, the information processor 100 includes an IP address conversion server registration unit 101, an IP address conversion server selection unit 102, and a call execution unit 103.

Among these, the IP address conversion server registration unit 101 registers a list 111 of a plurality of IP address conversion servers 130 for performing the conversion of an IP address needed for the call between the phone on the calling side 110 and the phone on the called side 120.

In addition, the IP address conversion server selection unit 102 selects, on the basis of the location of the phone on the calling side 110 or the phone on the called side 120, the IP address conversion server 130 to be used from the list 111 registered in the IP address conversion server registration unit 101.

The call execution unit 103 executes, using the selected IP address conversion server 130, a call while performing IP address conversion for voice packets exchanged between the phone on the calling side 110 and the phone on the called side 120.

As described above, since the IP address conversion server 130 is selected on the basis of the location of the phone on the calling side 110 or the phone on the called side 120, when voice communication is executed while performing the IP address conversion for the voice packets, the concentration of traffic can be avoided.

(Second Embodiment)

Hereinafter, an information processing system 200 according to a second embodiment of the invention will be described with reference to FIGS. 2 to 6.

<Configuration>

Figure 2:
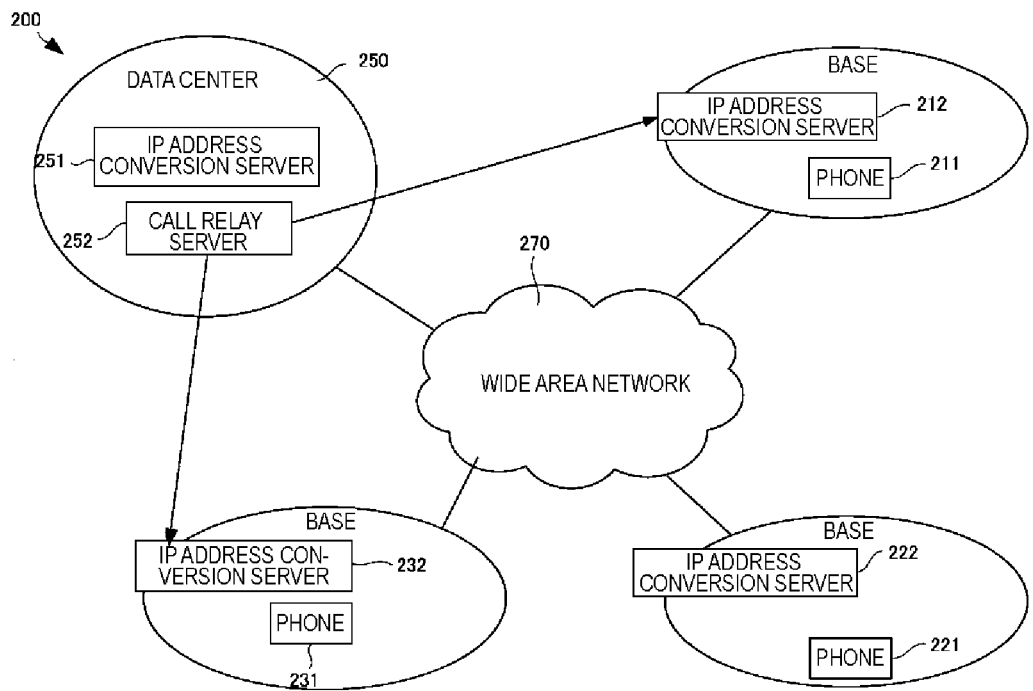
FIG. 2 is a block diagram illustrating a configuration of an information processing system according to a second embodiment of the invention.

As shown in FIG. 2, the information processing system 200 includes a data center 250 and phones 211, 221, and 231 that are disposed at a plurality of bases. The data center 250 and the phones 211, 221, and 231 are connected to each other through a wide area network 270. The data center 250 includes an IP address conversion server 251 and a call relay server 252.

Meanwhile, here, the base represents each of a plurality of wireless LAN areas included in one intranet. The base does not have a physical boundary, and indicates a logical range for determining which phone uses which IP address conversion server. In other words, in the embodiment, it is assumed that a user carrying a phone wanders around a wireless LAN in an intranet.

The IP address conversion servers 212, 222, 232, and 251 have the same configuration, and convert the IP address for the voice packet received from the phones on the called side and the calling side into an IP address of a phone of a call party.

Figure 3:
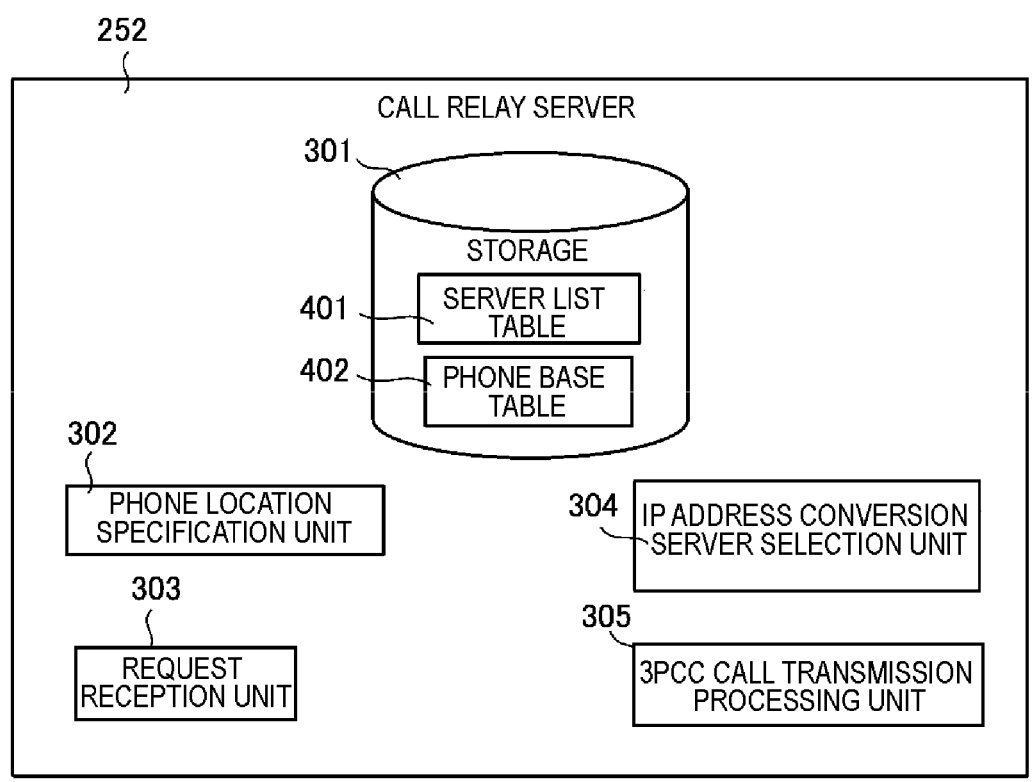
FIG. 3 is a block diagram illustrating an internal configuration of a call relay server according to the second embodiment of the invention.

Hereinafter, an internal configuration of the call relay server 252 will be described with reference to FIG. 3. As shown in FIG. 3, the call relay server 252 includes storage 301, a phone location specification unit 302, a request reception unit 303, an IP address conversion server selection unit 304, and a 3PCC call transmission processing unit 305.

Among these, the request reception unit 303 receives a request for call transmission to the phone on the called side from the phone on the calling side. At this time, the request reception unit 303 receives the IP address of the phone on the calling side and the IP address of the phone on the called side and passes the IP addresses to the phone location specification unit 302. Basically, in order to select the IP address conversion server, it is only necessary to know the location of any one of the phone on the calling side or the phone on the called side. In other words, there is no need to obtain both the IP addresses, and if there is only one IP address, the operation can be done. Accordingly, the IP address conversion server may be selected on the basis of the IP address on the side of which the location is known.

The storage 301 registers a list of a plurality of IP address conversion servers that perform the conversion of an IP address need for a call between the phone on the calling side and the phone on the called side. Specifically, the storage 301 includes a server list table 401 and a phone base table 402. As shown in FIG. 4A, the server list table 401 stores a correspondence relationship between a base ID and the IP address of the IP address conversion server that is used in the base. In addition, as shown in FIG. 4B, the phone base table 402 stores a correspondence relationship between the IP address of the phone and the base ID.

The phone location specification unit 302 has a function to specify the location (base) of the phone on the calling side or the phone on the called side with reference to the phone base table 402 using the IP address of the phone which is obtained from the request reception unit 303. Meanwhile, the location may be specified from a GPS coordinate of the phone on the calling side or the phone on the called side. In this case, the phone location specification unit 302 holds a correspondence table of the ranges of latitude and longitude and the location, and can specify the base from a GPS position.

The specified phone location (base ID) is passed to the IP address conversion server selection unit 304. The IP address conversion server selection unit 304 guides the IP address of the IP address conversion server to be used with reference to the server list table 401 shown in FIG. 4A using the obtained phone location (base ID), and passes the IP address to the 3PCC call transmission processing unit 305.

The 3PCC call transmission processing unit 305 transmits a call to both the designated phone on the calling side and phone on the called side and connects lines of the phone on the calling side and the phone on the called side.

<Operations>

Figure 5:
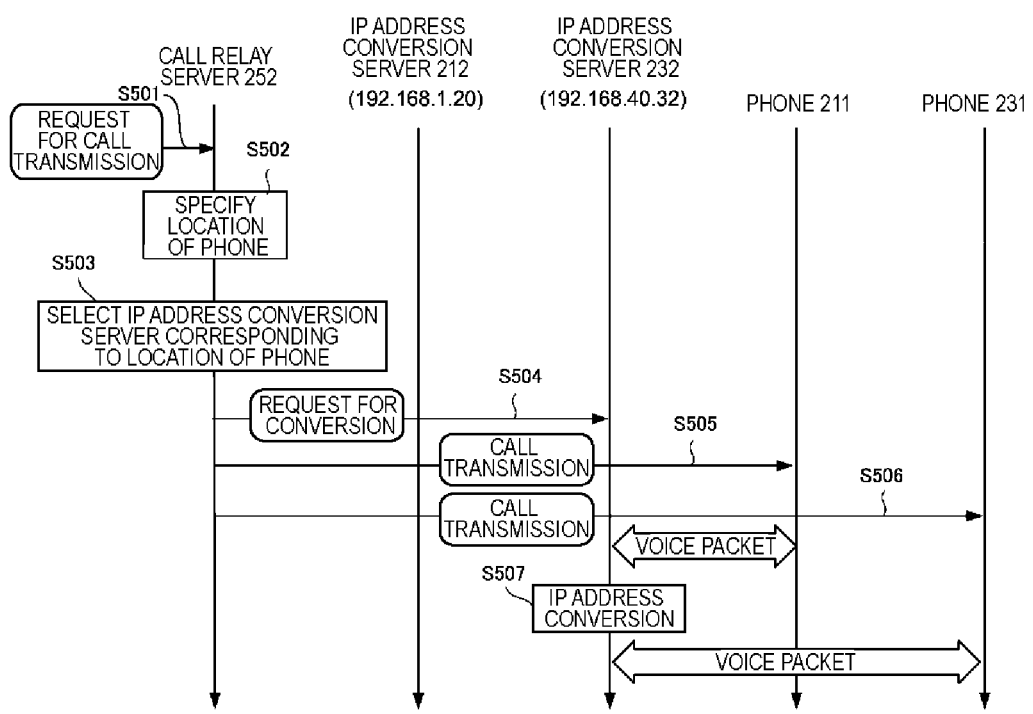
FIG. 5 is a sequence diagram illustrating a processing flow of the information processing system according to the second embodiment of the invention.

In step S501 of FIG. 5, when the call relay server 252 receives a request for call transmission, the call relay server 252 analyzes the request for call transmission in step S502 and determines between which phones a call should be made. Specifically, the call relay server 252 specifies the phone and the location of the phone.

Next, in step S503, the call relay server 252 selects the IP address conversion server corresponding to the location of the phone. The base of the phone is specified using the IP address of the phone and the phone base table 402. Further, the IP address conversion server corresponding to the base is specified using the server list table 401. At this time, when the IP address conversion server corresponding to the location of the phone on the calling side or the phone on the called side does not have a capacity to perform a new IP address conversion process, the call relay server 252 may select the IP address conversion server that is established in advance in the call relay server 252.

Next, in step S504, the call relay server 252 sends a request for IP address conversion to the specified IP address conversion server 232 for the voice packets exchanged between the phone on the calling side 211 and the phone on the called side 231. In addition, in step S505, the call relay server 252 performs a call transmission process with respect to the specified phone on the calling side 211. Further, in step S506, the call relay server 252 performs a call transmission process with respect to the phone on the called side 231. These call transmission processes include an instruction to use the IP address conversion server 232 for IP address conversion.

For this reason, the phone 211 sends the voice packets to the IP address conversion server 232. When the IP address conversion server 232 receives the voice packets from the phone 211, the IP address conversion server 232 converts a destination IP address into the phone 231 and sends the converted destination IP address to the phone 231. Conversely, the phone 231 also sends the voice packets to the IP address conversion server 232. When the IP address conversion server 232 receives the voice packets from the phone 231, the IP address conversion server 232 converts a destination IP address into the phone 211 and sends the converted destination IP address to the phone 211.

Figure 6:
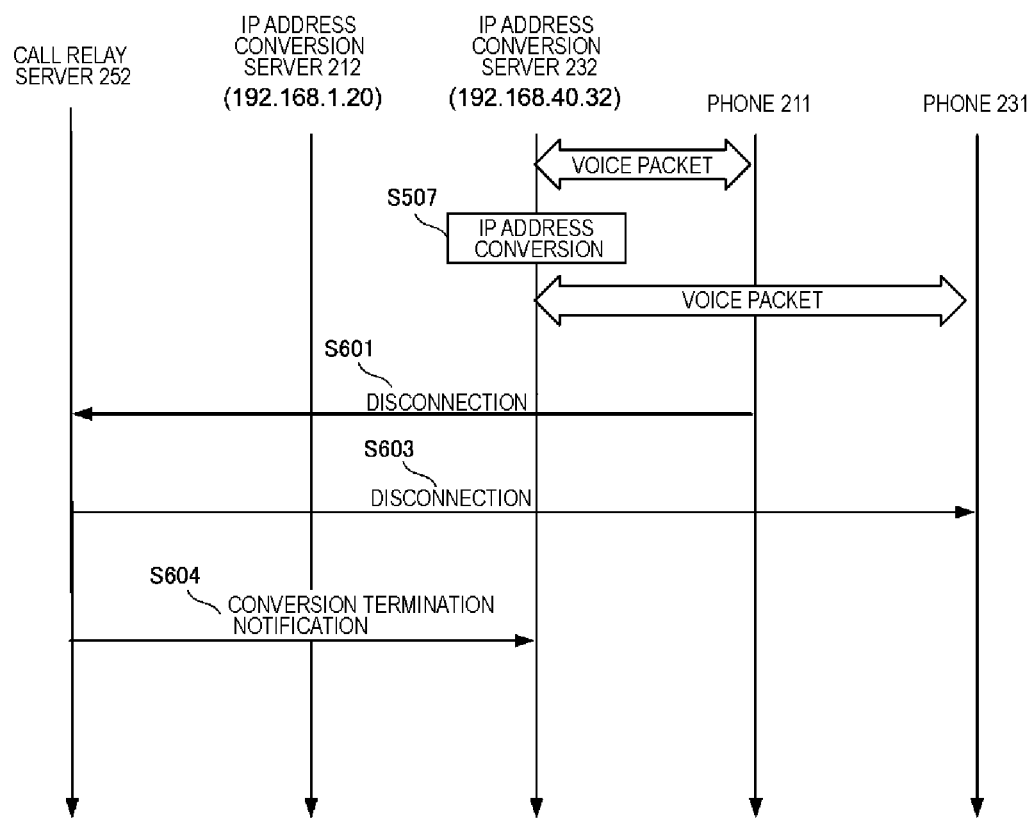
FIG. 6 is a sequence diagram illustrating a processing flow of the information processing system according to the second embodiment of the invention.

On the other hand, as shown in step S601 of FIG. 6, at the time of disconnection, the phone 211 sends an instruction for disconnection to the call relay server 252. The instruction for disconnection is sent from the call relay server 252 to the phone 231. Further, in step S604, a conversion termination notification is sent to the IP address conversion server 232.

<Effects of Embodiment>

As described above, according to the embodiment, since the IP address conversion server is selected on the basis of the location of the phone on the calling side or the phone on the called side, when a voice communication is executed while performing IP address conversion of the voice packets, the concentration of traffic can be avoided.

(Third Embodiment)

Figure 7:
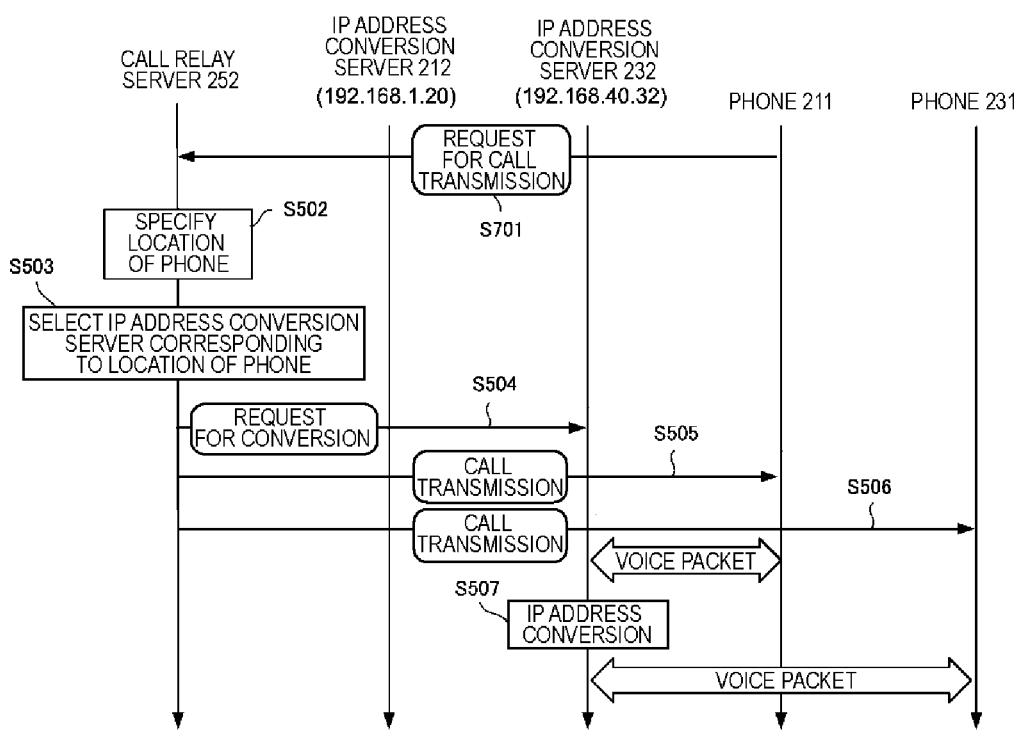
FIG. 7 is a sequence diagram illustrating a processing flow of the information processing system according to a third embodiment of the invention.

Hereinafter, an information processing system according to a third embodiment of the invention will be described with reference to FIG. 7. FIG. 7 is a sequence diagram illustrating a process in the information processing system according to the embodiment. The third embodiment described with reference to FIG. 7 is different from the second embodiment described with reference to FIG. 5 in that a request for call transmission is sent from the phone on the calling side 211 to the call relay server 252.

When the call relay server 252 receives an instruction for call transmission from the phone on the calling side 211, the location of the phone 211 is specified by the IP address of the phone 211 when receiving the instruction for call transmission. Other components and operations of the embodiment are the same as those of the second embodiment, and thus their description will not be repeated here.

The same effects as the second embodiment can be also obtained by the embodiment.

(Fourth Embodiment)

Figure 8:
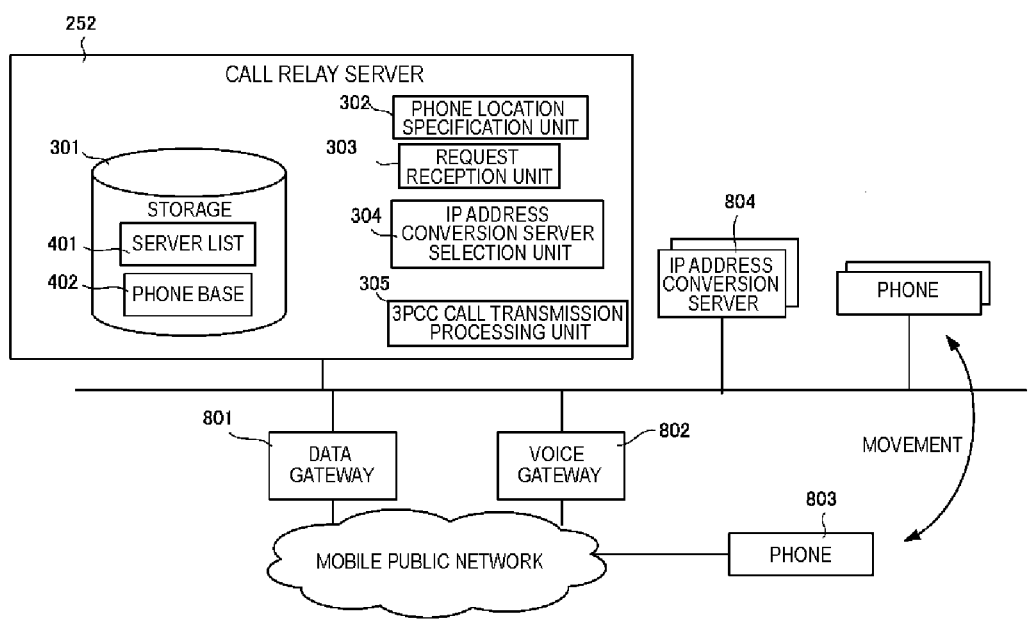
FIG. 8 is a block diagram illustrating a peripheral configuration of a call relay server according to a fourth embodiment of the invention.
Figure 9:
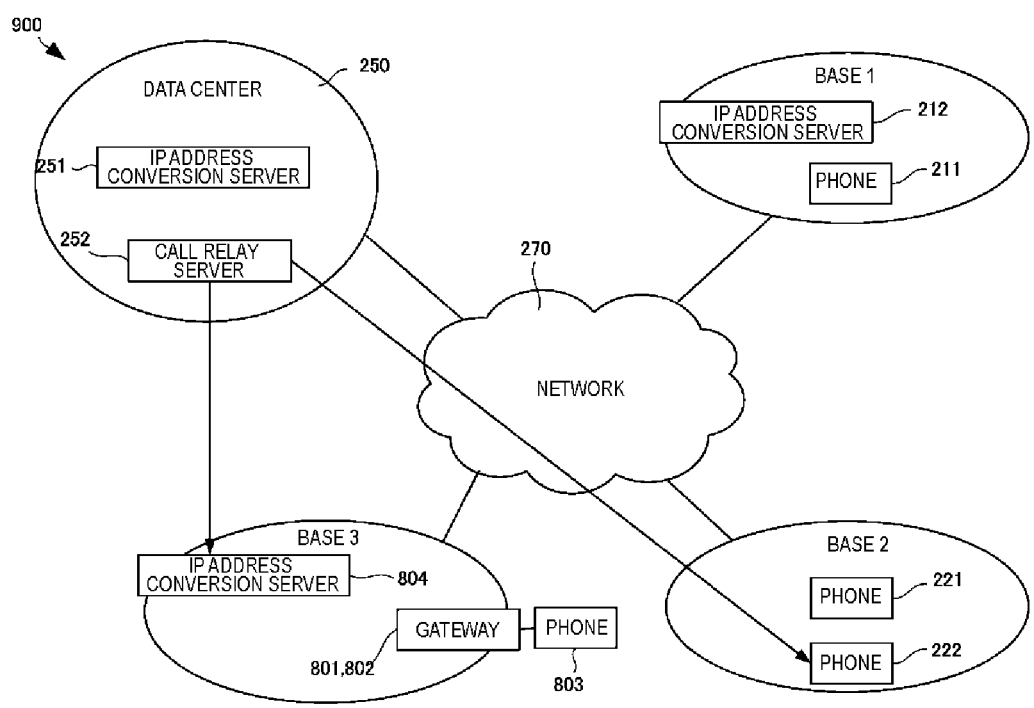
FIG. 9 is a block diagram illustrating a configuration of an information processing system according to the fourth embodiment of the invention.

Hereinafter, an information processing system according to a fourth embodiment of the invention will be described with reference to FIGS. 8 and 9. FIGS. 8 and 9 are diagrams illustrating a method of selecting an IP address conversion server in a state where a phone is located outside a gateway. FIG. 8 is a detailed block diagram illustrating a peripheral configuration of the call relay server 252. FIG. 9 is a diagram illustrating the entire configuration of an information processing system 900 according to the embodiment. In the above second and third embodiments, it is assumed that a user carrying a phone wanders around a wireless LAN in an intranet. On the other hand, in the embodiment, a scene is assumed in which the user goes out of the intranet and uses the phone from a hotspot on the Internet or a mobile phone network.

When the phone is located outside the gateway, it is difficult to specify the location of the phone using the IP address. In addition, the IP address conversion server is located inside the gateway. Wherever the phone located outside the gateway is located, the IP address conversion server can see nothing but the gateway. Therefore, the method of selecting the IP address conversion server varies.

Initially, when the call relay server 252 receives a request for call initiation from a phone 803 located outside gateways 801 and 802, the call relay server 252 confirms the IP address of the phone 803, and can determine that the phone 803 is located outside the gateway at that stage. Specifically, the location of the phone 803 can be determined by holding a list of arranged IP addresses of the gateway therein or by viewing whether the IP address is a private address or a global address. When the call relay server 252 can determine that the phone 803 is present outside the gateway, the IP address conversion server selection unit 304 selects an IP address conversion server 804 that is present at the base where a voice gateway 802 is provided. When the phone is located inside the gateway, the same processes as the second and third embodiments are performed.

As described above, according to the embodiment, when the phone is located outside the gateway, the IP address conversion server that is close to the gateway is used, and thus traffic can be reduced without increasing a bandwidth of a wide area network.

(Fifth Embodiment)

Figure 10:
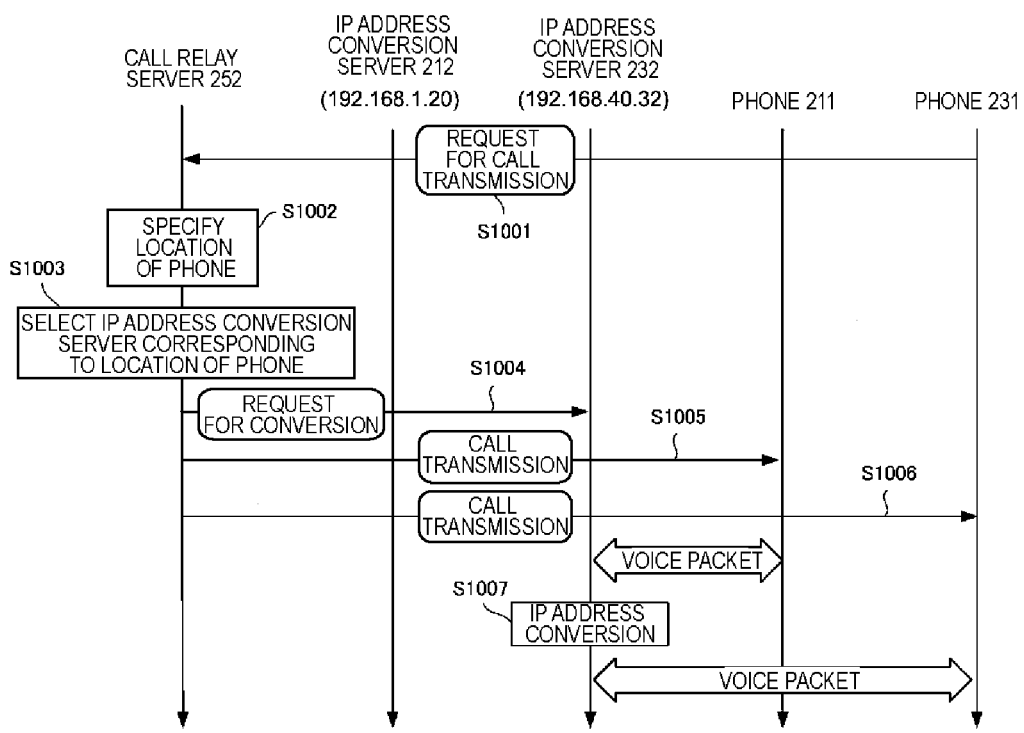
FIG. 10 is a sequence diagram illustrating a processing flow of an information processing system according to a fifth embodiment of the invention.

Hereinafter, an information processing system according to a fifth embodiment will be described with reference to FIG. 10. Unlike the fourth embodiment, in the embodiment, a moment of a call process is a request for call transmission from the phone 231 that received an incoming call in the past from the phone 211 rather than a request for call transmission from the phone 211.

For example, although call transmission is made from the phone 211 to the phone 231, when a call cannot be established because a user is in absentia or on the phone, the incoming call from the phone 231 is ascertained, and thus a request for call transmission with the phone 211 is performed with respect to the call relay server 252 (S1001).

Three methods of requesting for call transmission to the relay server which are assumed herein are considered as follows.

(1) A request by data communication. For example, a method of sending a phone number of the other party (and/or identification information on call transmission side) to a request parameter thereof using HTTP and FTP.

(2) A method of calling a representative number of a relay server to access the relay server, and then designating the other party using a push tone (DTMF signal), and the method is called "an additional dial-in".

(3) A method of using an individual phone number that is allocated in advance to a user in the relay server. For example, when the relay server has number bands of 0501111000 to 0501111999, and among these, 0501111222 is allocated to a call-receiving user, if an incoming call occurs in 0501111222 of the relay server, it is recognized that the incoming call is a request for a call with the call-receiving user.

The original instruction for call transmission as described in the second embodiment generally use the method (1) or (2), but in the case of a return call, in the embodiment, the method (3) may be used. In the embodiment, if the phone 211 originally performs call transmission with respect to the phone 231, a message saying "there is an incoming call from 0501111222" is displayed on a display unit of the phone 231. On the other hand, if the phone 231 performs call transmission of a return call with respect to the 0501111222, the relay server recognizes that it is a request for call transmission from the phone 231 to the phone 211.

Thereafter, the call relay server 252 specifies at least one location of the phone 211 and the phone 231 (S1002), and selects the IP address conversion server corresponding to the location of the phone (S1003).

The call relay server 252 sends a request for conversion to the selected IP address conversion server 232 (S1004) and then performs call transmission with respect to the phone 211 and the phone 231 (S1005 and S1006).

For this reason, the IP address conversion server 232 performs an IP address conversion process for the voice packets exchanged between the phone 211 and the phone 231 (S1007).

As described above, according to the embodiment, with regard to a request for call transmission from the phone 231 as the phone on the called side, the IP address conversion server close to the phone 231 or the phone 211 is used, thereby allowing traffic to be reduced without increasing a bandwidth of a wide area network.

(Other Embodiments)

Although the embodiments of the invention have been described, systems or devices in which individual characteristics included in the embodiments are combined in any way are included in the scope of the invention.

In addition, the invention may be applied to a system constituted by a plurality of devices, or may be applied to a single device. Further, the invention can also be applied to a case where an information processing program realizing functions of the embodiments is provided to the system or the device directly or remotely. Therefore, in order to realize the functions of the invention using a computer, a program installed in the computer, a medium storing the program, and a WWW (World Wide Web) server causing the program to be downloaded are all included in the scope of the invention.

The application claims the priority based on Japanese Patent Application No. 2010-267875 filed on Nov. 30, 2010, the content of which is incorporated herein by reference.

The invention claimed is:

1. A device comprising at least one hardware processor and a memory, wherein the device receives a request for initiating a call between a phone on the calling side and a phone on the called side and performs call transmission with respect to the phone on the calling side and the phone on the called side, the device further comprising:
   a register configured to register a list of a plurality of IP address conversion servers and information indicating an area assigned to each of the servers, the servers performing IP address conversion needed for a call between the phone on the calling side and the phone on the called side;
   a location specifier configured to determine a location of the phone on the calling side or the phone on the called side;
   a selector configured to select, on the basis of the location of the phone on the calling side or the phone on the called side, the IP address conversion server to be used from the list that is registered in the register, the server assigned to the area including the location of the phone on the calling side or the phone on the called side; and
   a call executor configured to execute, using the selected IP address conversion server, a call while performing IP address conversion for voice packets exchanged between the phone on the calling side and the phone on the called side,
   wherein when the device receives a request for call initiation from a phone located outside a gateway, the information processor confirms an IP address of the phone, and determines whether the phone is located outside the gateway, and
   call transmission to a relay server is requested by:
       a request by data communication of a phone number of another party as a request parameter thereof using HTTP and FTP;
       a call to a representative number of the relay server to access the relay server, and then designating the other party using a push tone DTMF signal as an additional dial-in; and
       using an individual phone number that is allocated in advance to a user in the relay server.

2. The device according to claim 1, wherein the location specifier is further configured to specify the location from an IP address of the phone on the calling side or the phone on the called side.

3. The device according to claim 1, wherein the location specifier is further configured to specify the location from a GPS coordinate of the phone on the calling side or the phone on the called side.

4. The device according to claim 1, wherein the register is further configured to register a list showing a correspondence relationship between the IP address of the phone on the calling side or the phone on the called side and the IP address conversion server.

5. The device according to claim 1, wherein the selector is further configured to, when the IP address conversion server to be used is not able to be selected from the list registered in the register on the basis of the location of the phone on the calling side or the phone on the called side, select a predetermined IP address conversion server.

6. The device according to claim 1, wherein the selector is further configured to, when the IP address conversion server corresponding to the location of the phone on the calling side or the phone on the called side does not have a capacity to perform a new IP address conversion process, select a predetermined IP address conversion server.

7. An information processing method of controlling a device that receives a request for initiating a call between a phone on the calling side and a phone on the called side to perform call transmission with respect to the phone on the calling side and the phone on the called side, the information processing method comprising:
   registering a list of a plurality of IP address conversion servers performing IP address conversion needed for a call between the phone on the calling side and the phone on the called side;
   determining a location of the phone on the calling side or the phone on the called side;
   selecting the IP address conversion server to be used from the list, on the basis of the location of the phone on the calling side or the phone on the called side;
   executing, using the selected IP address conversion server, a call while performing IP address conversion for voice packets exchanged between the phone on the calling side and the phone on the called side;
   receiving a request for call initiation from a phone located outside a gateway;
   confirming an IP address of the phone;

determining whether the phone is located outside the gateway; and requesting a call transmission by:
- requesting by data communication of a phone number of another party as a request parameter thereof using HTTP and FTP;
- calling to a representative number of a relay server to access the relay server, and then designating the other party using a push tone DTMF signal as an additional dial-in; and using an individual phone number that is allocated in advance to a user in the relay server.

8. A non-transitory computer-readable storage medium storing an information processing program comprising instructions for controlling a device comprising at least one processor to receive a request for initiating a call between a phone on the calling side and a phone on the called side to perform call transmission with respect to the phone on the calling side and the phone on the called side, the method comprising:

registering a list of a plurality of IP address conversion servers performing IP address conversion needed for a call between the phone on the calling side and the phone on the called side;

determining a location of the phone on the calling side or the phone on the called side;

selecting the IP address conversion server to be used from the list, on the basis of the location of the phone on the calling side or the phone on the called side;

executing, using the selected IP address conversion server, a call while performing IP address conversion for voice packets exchanged between the phone on the calling side and the phone on the called side;

receiving a request for call initiation from a phone located outside a gateway;

confirming an IP address of the phone;

determining whether the phone is located outside the gateway; and requesting a call transmission by:
- requesting by data communication of a phone number of another party as a request parameter thereof using HTTP and FTP;
- calling to a representative number of a relay server to access the relay server, and then designating the other party using a push tone DTMF signal as an additional dial-in; and using an individual phone number that is allocated in advance to a user in the relay server.

* * * * *